Feb. 27, 1934.  C. E. FURGASON  1,948,910
THERMOSTATIC SHUTTER CONTROL
Filed July 21, 1930
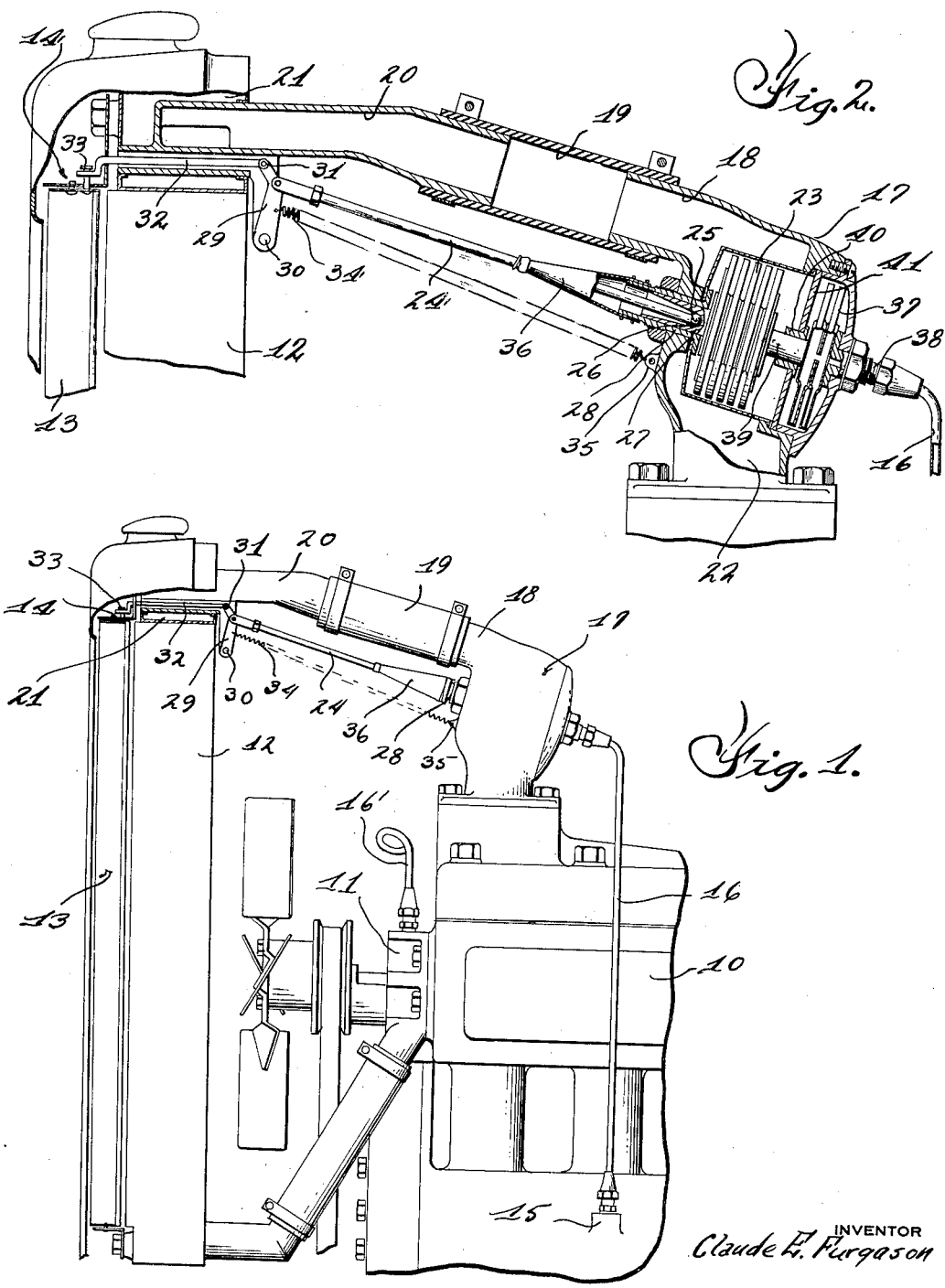
INVENTOR
Claude E. Furgason
BY
Whittemore Hulbert Whittemore
& Belknap  ATTORNEYS

UNITED STATES PATENT OFFICE 1,948,910

THERMOSTATIC SHUTTER CONTROL

Claude E. Furgason, Lansing, Mich., assignor to Reo Motor Car Company, Lansing, Mich., a corporation of Michigan Application July 21, 1930. Serial No. 469,563

11 Claims. (Cl. 123—174)

This invention relates to shutter control mechanism and more particularly to an automatic shutter control mechanism for operating the shutters associated with the radiator of a motor vehicle or the like.

Heretofore it has been customary to provide thermostatic shutter control means which act to automatically open the shutters when the water temperature of the radiator reaches a predetermined point, this thermostatic mechanism operating conversely to permit the shutters to close when the temperature of the water in the radiator has fallen below a predetermined point.

These prior known thermostatic mechanisms have, however, operated to open and close the shutters in dependence only upon the water temperature in the radiator and irrespective of whether the motor vehicle or the motor thereof was running or idle. Therefore, with these prior known devices if the thermostat is set to open the shutters at, for instance 180° F. and the water in the radiator had reached a temperature in excess of 180°, then the thermostat control mechanism would open the shutters and maintain the same open until the temperature had fallen below a point of 180° F. If, however, in the meantime the motor vehicle is brought to a stop and the engine shut off, it is desirable to immediately close the shutters so that the water in the radiator and as a consequence, the motor, can be kept warm to facilitate the subsequent starting and efficient operation thereof. Likewise, if means is provided for closing the shutters when the vehicle has been stopped, irrespective of the set action of the thermostat, it is likewise important that the shutters should be again opened immediately that the vehicle is started, if at that time the temperature of the radiator water is above, for instance, 180°, assuming that that is the temperature at which the thermostat is set to operate.

Therefore, in accordance with the invention, I propose combining with a thermostatic control mechanism for radiator shutters, means for supplementing or modifying the action of the thermostatic means or in other words, the provision of additional means for operating the shutters dependent upon whether the motor of the vehicle is operating or idle.

Various objects of this invention, together with the novel arrangement, combination and construction of parts will be made more apparent as this description proceeds, especially when considered in connection with the accompanying drawing, wherein Figure 1 is a semi-diagrammatic side elevational view of a motor vehicle engine, radiator and shutter structure having associated therewith my improved thermostat control mechanism;

Figure 2 is an enlarged vertical sectional elevational view through the shutter control mechanism per se.

Referring now to the drawing wherein like reference characters indicate like parts, it will be noted that there is illustrated semi-diagrammatically an internal combustion engine 10, provided with a water pump 11 and a radiator 12, these two latter parts forming a portion of the usual circulatory water cooling system quite customarily employed in connection with motor vehicle power plants. The reference character 13 indicates generally the shutter structure for closing the front of the radiator and 14, indicates the interconnecting linkage for operating the shutter. The reference character 15 indicates generally the oil pump of the motor and 16 an oil pipe line.

The reference character 17 indicates a housing or casing mounted as shown on the cylinder head of the engine at the forward end thereof. This casing or housing contains the operating elements of the shutter control mechanism and in order to provide for the circulation therethrough of the water of the cooling system, the housing 17 is provided with a tubular extension 18 connected by a conduit 19 with the tubular inlet 20 of the upper radiator header or tank 21 of the radiator 12. The housing 17 at the bottom thereof is connected through the opening 22 thereof to the water jacket of the cylinder head.

The reference character 23 indicates a heat responsive or thermostatic mechanism or means for actuating the shutter mechanism 13 in response to the temperature of the water of the cooling system. The particular form of construction of this thermostatic means forms no particular part of the present invention. However, as the temperature of the water of the circulatory system rises, the thermostatic means 23 expands and acts through rod 24 to open the shutters 13. This rod, in the form of construction herein illustrated, is provided on the end adjacent the thermostatic means 23 with a semi-spherical or ball-shaped end 25 engaging in a recess 26 of a socket member 27 connected to the thermostatic means 23. This socket is slidably mounted in a sleeve 28 fixed to the housing 17. The other end of rod 24 is connected to a link 29 pivotally supported as at 30, the free end of this link being pivotally connected as at 31 to the adjacent end of a rod 32 pivotally connected as at 33 to the linkage 14 of the shutters 13. The shutters may be normally maintained in closed position, and returned to this position after being opened by the mechanism herein described, by means of a spring 34 connected on the one hand to the link 29 and on the other hand to a lug 35 formed on the housing 17. If desired, a protective hood or enclosure 36 may be provided around the joint between the rod 24 and the socket member 27.

In accordance with my invention, I propose the provision of additional means for modifying or controlling the action of the thermostatic means 23, this additional means comprising one or more expansible members 37, these expansible members being in the form of relatively flat hollow circular disk-like members having their interiors interconnected and also connected to a fluid pressure inlet or conduit 38, the latter extending exteriorly of the housing 17 as indicated in Figure 2. The expansible member or members 37 are operatively connected to the thermostatic means 23 through the medium of a slidable shaft or plug 39 engaging the expansible member 37 at one end thereof and the thermostatic means 23 at the other end. This plug 39 is slidably mounted in a sleeve or bushing 40 mounted in a partition 41 within the housing 17. This plug 39 acts as an abutment for the adjacent end of the thermostat 23 when the expansible members 37 are expanded.

The fluid pressure inlet 38 of the expansible members 37 may be connected to the oil line 16 or it may be connected for instance, to a conduit or pipe 16′ extending from the water pump 11 of the circulatory system of the motor. In either of these two instances, the expansible members 37 become operative only during the active period of the motor because, for instance, when the motor is running there will be oil under pressure in the oil line 16 or water under pressure in the water conduit 16′. This fluid under pressure will, therefore, flow through the conduit connected to the inlet 38 and thence into the interior of the expansible members 37 whereby these expansible members will expand and, provided the thermostat 23 is expanded, will axially displace the plug or shaft 39 and through the thermostatic means 23 will impart an opening movement to the shutter operating means 24—29—32. When, however, the engine is stopped the pressure is relieved in the expansible members 37 and the spring 34 will close the shutters. From the foregoing it will be obvious that whenever the motor of the motor vehicle has been stopped that the spring 34 will close the shutters even though the thermostatic device 23 is still sufficiently expanded to normally maintain the shutters open, this being due to the added movement imparted to the operating means by the expansion and contraction of the elements 37. If, however, the motor is again started while the thermostatic means 23 is still in expanded condition the parts will again assume the position in which the shutters are open. The herein described structure has the added advantage that, particularly, in cold weather the shutters may be immediately moved to closed position when the motor is brought to a stop so that when it is subsequently desired to re-start the motor it will have been maintained in a warmer condition that has heretofore been possible.

While in describing the present invention, the expansible elements 37 have been described as connected either to the oil pressure line or to the water pressure line of the motor, the present invention contemplates means for modifying the action of the thermostatic means by any means which becomes operative when the motor is running.

What I claim is my invention is:

1. In a mechanism of the class described, the combination with a motor having a fluid line under pressure during the operative periods of the motor, shutters, and heat responsive means adapted to actuate said shutters, of means operative by the pressure in said fluid line for controlling the actuation of said shutters by said heat responsive means.

2. In an arrangement of the character described, the combination with the oil pressure line of a motor, shutters and thermostatic shutter actuating mechanism, of an expansible element connected to said oil pressure line and operative by the pressure line to modify the operation of said thermostatic shutter actuating mechanism.

3. In a thermostatic shutter control mechanism, shutters, heat responsive means, means connecting said heat responsive means to said shutters, an expansible element, and a fluid pressure line connected to said expansible element said expansible element when expanded acting as an abutment for said heat responsive means to render the latter operative.

4. In an engine radiator shutter apparatus, thermostat means responsive to changes in engine temperature to open and close the shutters, and automatic means responsive to changes in the oil pressure of the engine to render the thermostat means effective when the engine is operating and ineffective when the engine is stopped.

5. In an engine radiator shutter apparatus, thermostat means responsive to changes in engine temperature to open and close the shutters, and automatic means responsive to changes in the oil pressure of the engine operating to close the shutters independently of the thermostat action when the engine is stopped.

6. In an automotive engine radiator shutter apparatus, a plurality of shutters, a thermostat to expand and open the shutters upon increases in engine temperature, a spring to cause the shutters to close upon contraction of the thermostat when the engine temperature decreases, an oil pump in the engine, and means responsive to the oil pressure created by said pump to render the thermostat ineffective when the engine is stopped and allow the spring to close the shutters regardless of the temperature of the engine.

7. In combination with an engine and shutters for controlling the flow of air which cools the engine, an engine operated oil pump, a thermostat for opening and closing the shutters upon changes in engine temperature, an expansible bellows to receive oil from the oil pump and be expanded thereby when the engine is running to maintain the thermostat in operative position, and a spring to close said shutters when the engine is stopped and the bellows collapse.

8. In combination with an engine and shutters for controlling the flow of air which cools the engine, an expansible thermostat for opening the shutters upon increases in engine temperature and allowing the shutters to close upon decreases in engine temperature, a spring for urging said thermostat in a direction to close said shutters, and an expansible bellows expanded by the oil pressure developed by the engine to resist movement of the thermostat in a shutter closing direction by the spring when the engine is running and adapted to collapse and allow such movement when the engine is stopped.

9. In combination, shutters for controlling the flow of cooling air to an engine, a thermostat, responsive to the temperature of the engine, adapted to open said shutters in response to increased engine temperature when said thermostat is provided with an abutment against which it may bear when exerting opening force on the shutters, and means utilizing oil pressure created by the engine when operating to provide such abutment when and only when the engine is operating.

10. In combination, shutters for controlling the flow of cooling air to an engine, a thermostat, responsive to the temperature of the engine, adapted when held against expansion in one direction to expand in the other direction to effect the opening of the shutters, and means for utilizing the oil pressure of the engine for preventing expansion of the shutters in said first-mentioned direction when and only when the engine is in operation.

11. In an engine shutter apparatus, a chamber adapted to receive liquid from the cooling liquid circulating system of the engine, a first expansible vessel in said chamber, said first expansible vessel expanding and contracting in response to changes in the temperature of the liquid, a second expansible vessel in said chamber, said second expansible vessel affording an abutment for the first expansible vessel, means for causing said second expansible vessel to be expanded when the engine is in operation, shutters, and means affording an operating connection between the shutters and the first expansible vessel.

CLAUDE E. FURGASON.